W. V. TURNER.
ELECTROPNEUMATIC BRAKE.
APPLICATION FILED AUG. 23, 1911.

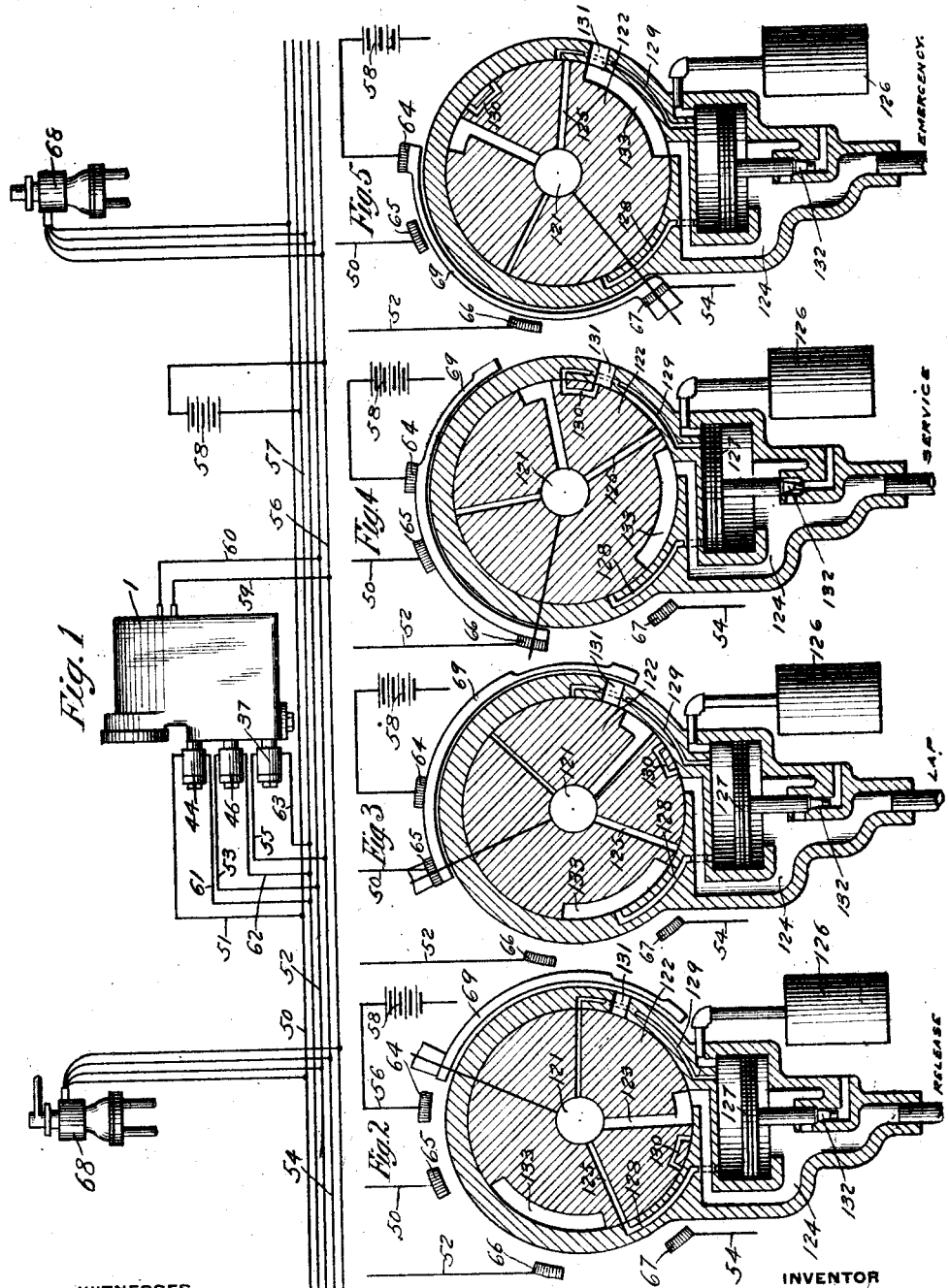

1,063,623.

Patented June 3, 1913.

5 SHEETS—SHEET 2.

WITNESSES

INVENTOR
Walter V. Turner
by Wm. M. Cady
Att'y.

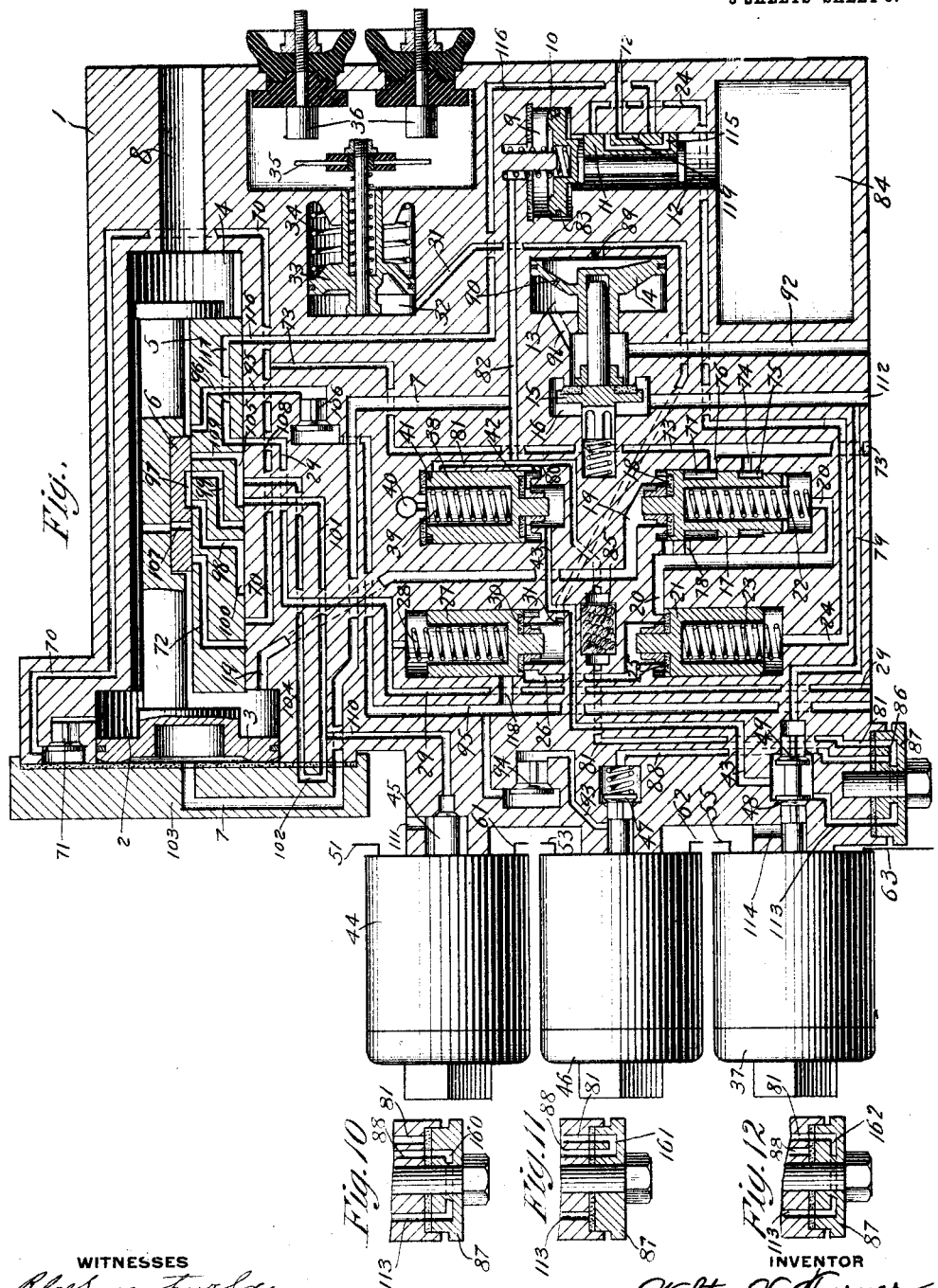

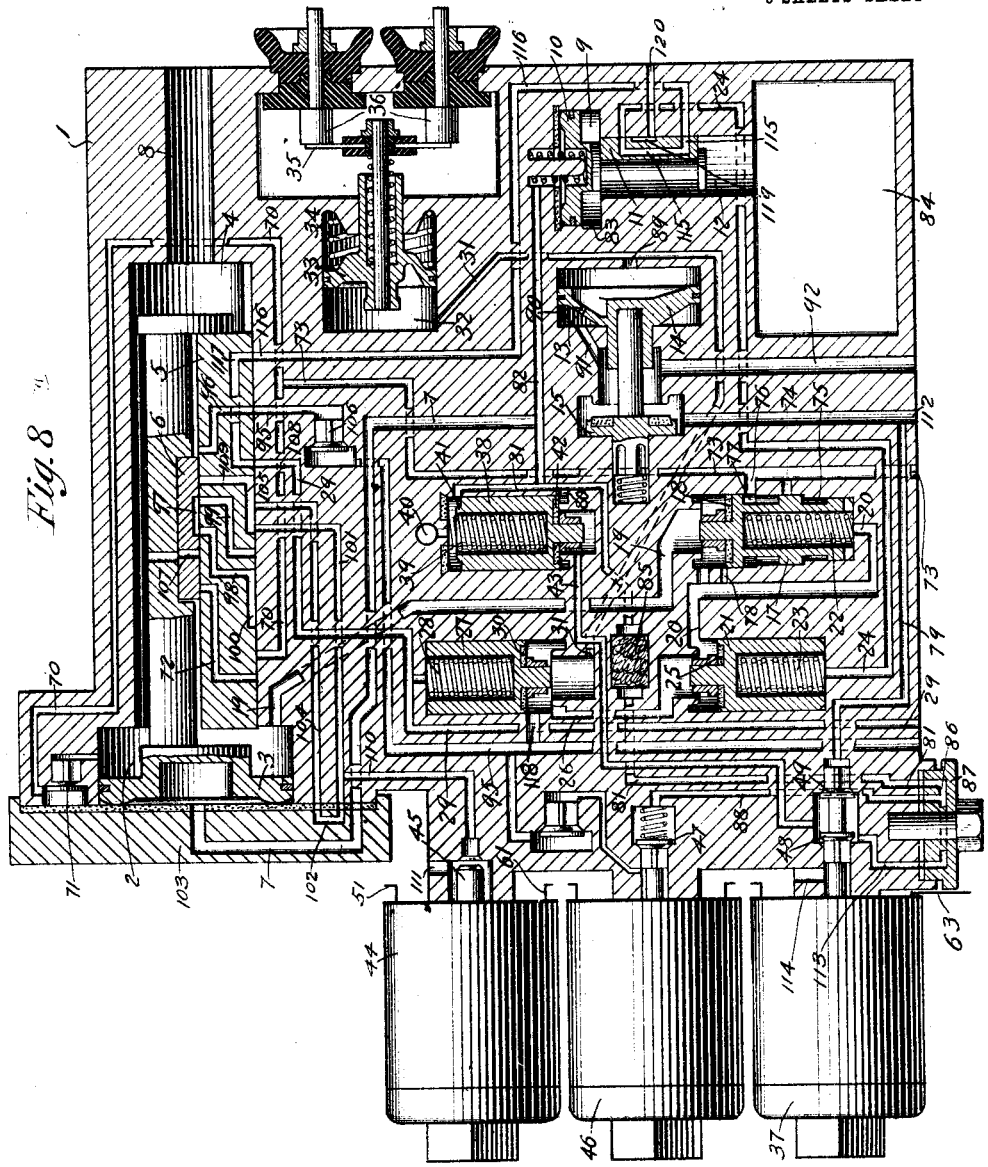

W. V. TURNER.
ELECTROPNEUMATIC BRAKE.
APPLICATION FILED AUG. 23, 1911.

1,063,623.

Patented June 3, 1913.
5 SHEETS—SHEET 5.

WITNESSES

INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC BRAKE.

1,063,623.  Specification of Letters Patent.  Patented June 3, 1913.

Application filed August 23, 1911. Serial No. 645,615.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brakes, of which the following is a specification.

This invention relates to fluid pressure brakes, and more particularly to an electropneumatic brake apparatus in which the brakes may be controlled both electrically and pneumatically.

The principal object of my invention is to provide an improved electro-pneumatic brake of the above character which is positive and reliable in operation and in which the electric control is so combined with the pneumatic control that in the event of failure of the electric control, the brakes may be operated pneumatically in the usual manner.

Other objects and advantages will be noted in the following more detailed description of the invention.

Figure 6:
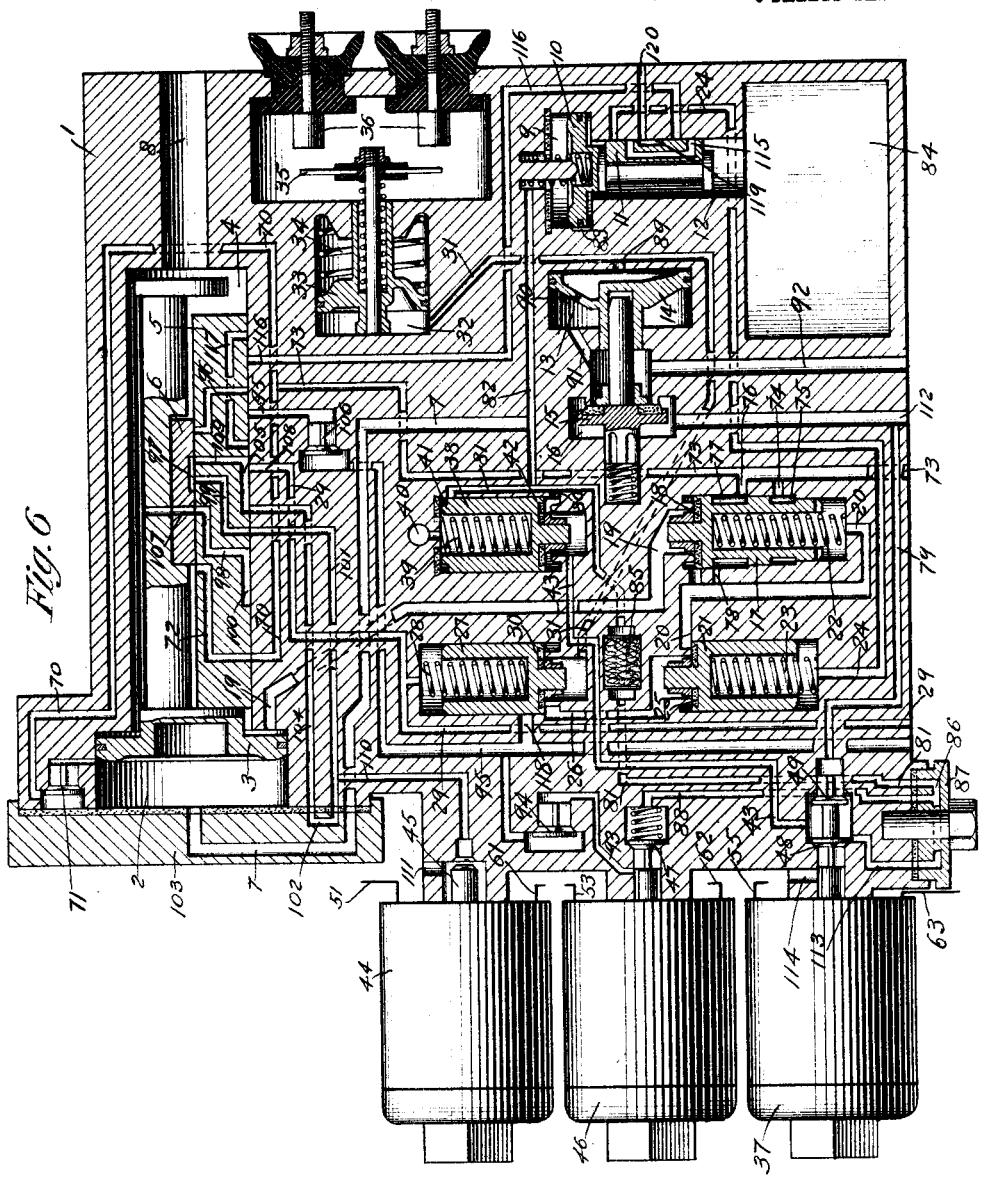

In the accompanying drawings: Figure 1 is a wiring diagram showing the connections employed for controlling the brakes electrically in accordance with my invention; Figs. 2 to 5 inclusive diagrammatic views of the combined brake valve and electric brake controller showing the parts in the respective positions of release, lap, service application, and emergency application; Fig. 6 a central sectional view of an electro-pneumatic brake controlling valve mechanism embodying my improvements, showing the parts in release position; Fig. 7 a similar view, showing the parts in electric service application position; Fig. 8 a similar view, showing the parts in electric emergency application position; Fig. 9 a central sectional view of an electro-pneumatic brake controlling valve mechanism embodying a slightly modified form of my invention; Fig. 10 a detail sectional view of a cut-out cap employed in connection with the controlling valve mechanism and in position for cutting out of action both the service and emergency magnet valves; Fig. 11 a similar view, showing the cap in position for cutting out the emergency magnet valve; and Fig. 12 a similar view, showing the cap in position for cutting out the service magnet valve.

The electro-pneumatic brake controlling valve mechanism shown in Figs. 6, 7, and 8 comprises a casing 1 having a piston chamber 2 containing piston 3 of the automatic valve device, a valve chamber 4 containing a main slide valve 5 and a graduating slide valve 6 mounted on the main slide valve and having a movement relative thereto, said valves being adapted to be actuated by the piston 3. The piston chamber 2 is connected to the train pipe through passage 7 and valve chamber 4 is open to the auxiliary reservoir through passage 8. The casing 1 also has a piston chamber 9 containing a piston 10 for operating an emergency slide valve 11, contained in valve chamber 12 and a piston chamber 13 containing a piston 14 for operating a quick action train pipe vent valve 15 contained in valve chamber 16 which is open to train pipe passage 112.

An intercepting valve piston device 17 is provided having a seat 18 at one end adapted in the seated position to normally expose a restricted area thereof to auxiliary reservoir pressure supplied through passage 19. The opposite side of the valve piston 17 is subject to the pressure of a coil spring 22 and is open to a passage 20 which is controlled by an emergency valve piston 21. The emergency valve piston 21 is subject on one side to the pressure of a coil spring 23 and is open to a passage 24 leading to and controlled by the emergency slide valve 11. The opposite end of said emergency valve piston is provided with a seat 25 and when seated exposes an outer area thereof to the fluid supplied to passage 20 and controls communication from passage 20 to passage 26, leading to valve piston 27. The closing valve piston 27 is subject on one side to the pressure of a spring 28 and is open to a passage 29 leading from the brake cylinder to the seat of the main slide valve 5. The opposite end of the closing valve piston is provided with a seat 30 and controls communication from passage 26 to a passage 31 leading to piston chamber 32 at one side of an emergency switch piston 33 and quick action piston 14. The emergency switch piston 33 is subject on the opposite side to the pressure of a spring 34 and is adapted to operate a movable contact 35 of an emergency switch, the fixed contacts 36 of which are connected in a circuit for controlling the operation of the emergency magnets 37.

A protection valve mechanism is also provided for insuring an emergency application of the brakes when the train pipe pressure drops to a predetermined degree, regardless of the rate of reduction in train pipe pressure, comprising a valve piston 38, subject on one side to the pressure of a spring 39 and constantly open to the atmosphere through an atmospheric port 40. Said valve piston is provided with a seat 41 at the atmospheric end adapted when seated to expose a restricted area of the valve piston to atmospheric pressure and is also provided with a seat 42 at the opposite end, adapted when seated to expose a restricted area to the pressure in passage 43, which is normally open to the train pipe.

For controlling the brakes electrically, a release magnet 44 is provided for operating a release valve 45, a service magnet 46 for operating a service application valve 47, and an emergency magnet 37 for operating valves 48 and 49.

While the particular arrangement of electric circuits is not essential, the scheme illustrated in Fig. 1 may be employed, in which five train wires are employed as follows: a release wire 50 having branch wires 51 leading to one terminal of the release magnet 44 on each car, an electric service application wire 52 having branch wires 53 leading to one terminal of the service application magnet 46 on each car, an emergency application wire 54 having branch wires 55 leading to one terminal of the emergency magnet 37 on each car, a supply wire 56, and a return wire 57, a battery or source of current 58 being connected across the supply and return wires either on each car of the train or only on the head car. The supply wire 56 and the emergency wire 54 are also connected respectively to branch wires 59 and 60 leading to the fixed contacts 36 of the electric emergency switch. The other terminals of the magnets 44, 46, and 37 are connected by the respective branch wires 61, 62, and 63 to the return wire 57. Train wires 56, 50, 52, and 54 are connected respectively to fixed contacts 64, 65, 66, and 67 in the combined brake valve and electric brake controller 68 and said brake valve is provided with a movable contact 69 for making the desired electric connections with said fixed contacts.

In operation, by manipulation of the brake valve, which may be of the usual standard type provided with an equalizing discharge valve mechanism, air is supplied to the train pipe and thence flows through passage 112, forcing the quick action valve 15 to its seat and through passage 79 past valve 49, passage 43, past protection valve 38, when same is lifted at a predetermined degree of train pipe pressure, and through port 80 and passages 81 and 82 to passage 7 which opens into piston chamber 2, thus shifting the piston 3 to release position, as shown in Fig. 6. In this position, air flows from piston chamber 2 through passage 70, past check valve 71, to port 72 in the main slide valve 5 and thence to valve chamber 4, thus charging the auxiliary reservoir. From valve chamber 4 air flows through passage 19 to the seat of the intercepting valve 17. Air also flows from passage 70 into a passage 73 which leads to a supplemental reservoir. Port 74 branching from passage 73, permits air from the supplemental reservoir to flow into the annular groove 75 of the intercepting valve 17. Port 76 allows air from the supplemental reservoir to flow through annular groove 77, port 78, and passage 20 to the spring side of the intercepting valve 17 and also to the outer exposed area of the emergency valve 21. As the emergency valve piston 21 is loosely fitted, air flows from passage 20 around the valve piston 21 to the chamber at the spring side of valve piston 21 and into passage 24. The full area of the valve piston 21 being exposed on the spring side to fluid pressure and the pressure of spring 23, the valve piston is prevented from lifting from its seat. With the protection valve 38 seated in its upper position, fluid from the train pipe passage 112 may flow through passages 79, 113, cavity 86, and passages 81 and 82 to piston chamber 9, as well as directly from the train pipe by way of passages 79, 43, 80, 81 and 82, if the valve 49 is open, shifting the piston 10 to release position, in which feed groove 83 is opened, so that valve chamber 12 is charged with fluid under pressure. The volume of the valve chamber 12 may be enlarged by the addition of a chamber 84, in order to give ample volume for various working conditions.

The electric service valve 47 is adapted to vent air from the train pipe to effect a service application of the brakes, and for this purpose, the train pipe passage 112 is connected to the under side of the valve through passages 79 and 113, cavity 86 in cap 87, and passage 88. Piston chamber 32 is connected by passage 31 and port 89 with the chamber at the outer face of the quick action piston 14 and the latter chamber is open to the atmosphere through a port 90 in the piston 14, passage 91, and quick action exhaust passage 92, so that any leakage into said chambers can escape to the atmosphere and thus prevent possible building up of fluid pressure tending to unseat the quick action valve 15 and tending to actuate the emergency switch piston 33.

Figure 4:
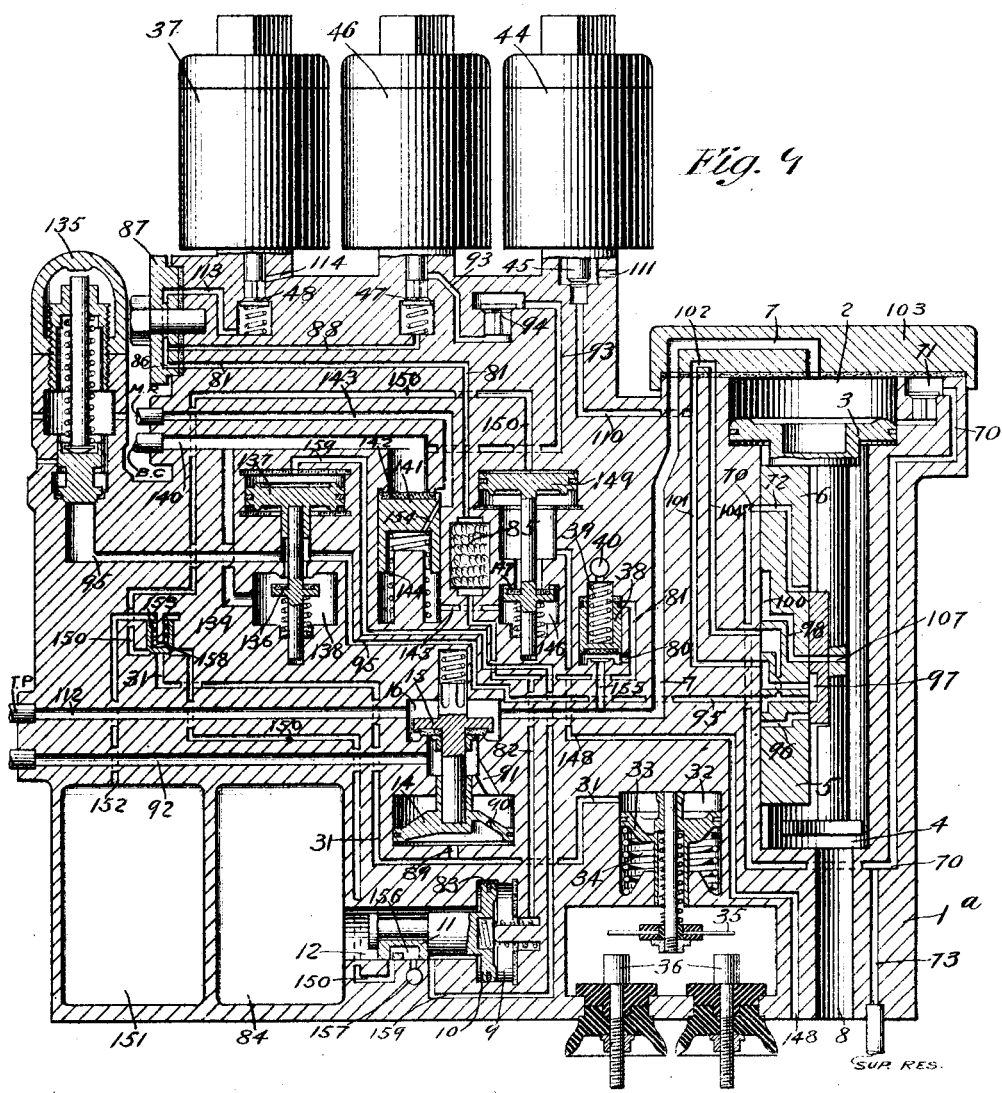

In order to effect an electric service application of the brakes, the brake valve is turned to service application position, in which, as shown in Fig. 4, the service contact 66 is connected to contact 64 by the moving contact 69, as well as the release contact 65. Current is then supplied to the service magnet 46, energizing the same to open the valve 47. Fluid from the train pipe thereupon flows from the passage 88 past the valve 47 to passage 93 containing check valve 94 and thence to brake cylinder passage 95 which leads to the brake cylinder. Passage 93 is preferably restricted so as to permit only a rate of train pipe reduction sufficient to effect the movement of the piston 3 and the valves 5 and 6 to the position in which the piston seats on the cylinder cap gasket but not rapid enough to cause movement of the emergency piston, since at this limited rate of train pipe reduction, fluid can flow through the feed groove 83 around piston 10 as rapidly as the train pipe pressure is reduced.

The reduction in train pipe pressure produced by the action of the electric service valve 47 therefore causes the piston 3 to shift to the position shown in Fig. 7, the first movement closing the auxiliary reservoir charging port 72 and opening service port 96. Cavity 97 in the graduating valve also connects ports 98 and 99 in the main slide valve 5 on the preliminary movement of the graduating valve 6, so that cavity 100, connected to port 98, is exposed to atmospheric pressure through passage 101 which registers with port 99, cavity 102 in cylinder cap 103, passage 104, cavity 105 in slide valve 5, and brake cylinder passage 29. The main valve 5 thus offers an increased resistance to movement from release position and therefore requires a greater differential in pressures to shift same. Consequently the main slide valve can not be shifted by variations in train pipe pressure such as are caused by fluctuations in the train pipe feed valve and the like. The further movement of the piston 3 to service application position shifts the main slide valve 5 so that service port 96 registers with brake cylinder passage 95 containing check valve 106 and air from the auxiliary reservoir is thus supplied to the brake cylinder. The service application magnet 46 may be held energized to cause a continuous reduction in train pipe pressure and thus permit equalization of the auxiliary reservoir into the brake cylinder, or the same may be energized for a short time and then deënergized by moving the brake valve to lap position, as shown in Fig. 3. In the latter case, the auxiliary reservoir pressure reduces by flow of fluid to the brake cylinder until the auxiliary reservoir pressure becomes slightly less than the reduced train pipe pressure, then the piston 3 is moved back to lap position in which the graduating valve 6 closes the service port 96.

To release the brakes, the brake valve is turned to release position, as shown in Fig. 2, in which the release contact 65 is disconnected from the source of current and the magnet 44 deënergized. The increase in train pipe pressure effected by the usual operation of the brake valve in release position, causes the piston 3 to return to release position in the usual manner. It will here be noted that the first movement of piston 3 from service application position toward release position causes the graduating valve 6 to connect port 107 with port 98, so that cavity 100 is supplied with fluid from the auxiliary reservoir, balancing the fluid pressures with respect to this cavity. By reason of the above, the main slide valve 5 moves more readily to release than to apply the brakes. In release position, as shown in Fig. 6, brake cylinder passage 29 is connected by passage 108 to cavity 105, so that fluid from the brake cylinder is exhausted to the atmosphere through port 109, cavity 97, port 99, passage 101, and passage 110, past electric release valve 45 to exhaust port 111.

If the brake valve is allowed to remain in release position, fluid will be released from the brake cylinder in the shortest possible time, but if it is desired to graduate the release of the brakes, the brake valve is moved to lap position, when the desired amount of air has been released from the brake cylinder. While the main piston 3 remains in release position, the release magnet 44 is energized in lap position, the release contact being connected as shown in Fig. 3, so that the further release of air from the brake cylinder is prevented. Thus by moving the brake valve between release and lap positions, the brake cylinder pressure may be graded down as desired, by the opening and closing of the electric release valve 45.

In order to effect an electric emergency application of the brakes, the brake valve is turned to emergency position, as shown in Fig. 5. In this position the emergency magnet circuit is closed, thus energizing the magnet 37 to close the valve 49 and open the valve 48. Fluid is thereupon vented from piston chamber 2 and piston chamber 9 through the respective passages 7 and 82, passage 81, cavity 86 in cap 87, passage 113, and past the emergency valve 48 to an atmospheric exhaust port 114. The main piston 3 is thus shifted to seat on the gasket of cap 103 and the emergency piston 10 is also shifted to emergency position, as shown in Fig. 8. The main piston and slide valve being in service application position, fluid is supplied from the auxiliary reservoir to the brake cylinder as in a service application of the brakes. The movement of slide valve 11 connects passage 24, through cavity 115 with passage 116, leading to the seat of the main slide valve 5, and passage 116 is connected through cavity 117 in the main slide valve with passage 108 leading to the brake cylinder. The reduction in pressure thus produced on the lower face of the emergency valve 21 permits the supplemental reservoir pressure in passage 20 acting on a portion of the upper area of said valve to shift same and open passage 20 to passage 26. The pressure on the under side of the intercepting valve 17 is thus reduced sufficiently, so that the auxiliary reservoir pressure in passage 19 on top of said valve is sufficient to shift the valve to open position, allowing fluid from the auxiliary reservoir to flow from passage 19 to passage 20 and thence through passage 26 and the closing valve 27 having been opened by the auxiliary reservoir pressure, to port 118 and brake cylinder passage 95.

The intercepting valve 17 remains open until the auxiliary reservoir and brake cylinder pressures have nearly equalized, when the same will seat again in its upper position and permit fluid from the supplemental reservoir to flow to the brake cylinder through passage 73, port 76, annular groove 77, port 78, passage 20, past emergency valve 21, passage 26, past closing valve 27 to brake cylinder passage 95. Either auxiliary reservoir air or supplemental reservoir air, as the case may be, also flows through passage 31 and forces the quick action piston 14 outwardly, opening the valve 15, so that fluid is vented from the train pipe through passages 112 and 92. Air also flows through passage 31 to the emergency switch piston 33 and operates the same to close the emergency switch. This closes the emergency circuit and insures the energization of the emergency magnets 37 regardless of whether the brake valve is moved from emergency position or not. Valves 21 and 27 remain open until final equalization of pressures has occurred, when the valves are closed by their respective springs. With these valves closed, fluid in passage 31 and in piston chamber 32 and the piston chamber of the piston 14 will be released through the port 90 in piston 14, so that the piston 14 and valve 15 are returned to closed position and the piston 33 opens the emergency switch. Preferably a resistance increasing cavity 119 is provided in the emergency slide valve 11 which is connected to an atmospheric passage 120.

If the electrical features of the above described apparatus become inoperative by loss of current, break down, or otherwise, the brakes may be pneumatically operated by manipulation of the brake valve in the usual manner. As shown in Figs. 2 to 5 inclusive the various electric control positions are identical with the pneumatic control positions, for instance, in electric release position, the brake valve connects the main reservoir port 121 in the rotary valve 122, through port 123, with passage 124 leading to the train pipe, so that the train pipe is charged with fluid under pressure, and port 125 also supplies fluid to the equalizing reservoir 126 open to one side of the usual equalizing piston 127 through passage 128.

In service application position, Fig. 4, the equalizing reservoir side of the equalizing piston 127 is connected to the atmosphere through passage 129, cavity 130, and exhaust port 131, so that the equalizing discharge valve 132 is operated to vent air from the train pipe at the same time that the electric service magnet is energized, to effect the movement of the automatic or triple valve piston 3 to service application position in case the electric control is inoperative. In lap position, Fig. 3, the pneumatic ports are blanked as usual, and in emergency application position, the train pipe passage 124 is connected directly to the exhaust port 131 through cavity 133, so that the train pipe pressure is rapidly reduced to effect the operation of the pneumatic portions of the valve mechanism 1 as previously described in connection with the electric control. If the operator should allow the brake valve to remain in service application position, or should excessive leakage take place in the train pipe, thus causing a continuous train pipe reduction, the brake would first apply to effect a service application of the brakes, then the auxiliary reservoir would equalize into the brake cylinder, and finally, when the train pipe pressure reduces to a predetermined degree as determined by the spring 39, the protection valve 38 will be operated to cut off communication between passages 43 and 81 and open communication from passage 82 through passage 81 to exhaust port 40, so that fluid is vented from the emergency piston 10 operating the same and thereby causing valves 21 and 27 to operate so that the supplemental reservoir is equalized into the brake cylinder as heretofore described in connection with the electric control. It will be noted that since the auxiliary reservoir has previously equalized into the brake cylinder, the intercepting valve 17 is not lifted by auxiliary reservoir pressure and consequently fluid from the supplemental reservoir at once flows to the brake cylinder. The various other parts operate as in an electric emergency application, as will be evident, except that if there is no current the emergency magnet and the emergency switch will be inoperative. Also, if the brake valve is allowed to remain in lap position, the train pipe leakage will eventually cause the particular valve to operate in the same manner as above described. The release of the brakes may be graduated pneumatically by turning the brake valve to release position and then back to lap position so as to make a slight increase in train pipe pressure. The piston 3 is thus moved to release position and air is released from the brake cylinder, but as the supplemental reservoir passage 73 is connected by passage 70 and port 72 to the auxiliary reservoir in release position, the supplemental reservoir air flowing into the auxiliary reservoir causes the piston 3 to move out and lap the brake cylinder exhaust port. The above action may be repeated as desired, to gradually reduce the brake cylinder pressure.

If cars equipped with the improved valve mechanism are used in a train with cars which do not have the electrical operating or graduated release features, the cylinder cap 103 is applied in the position shown in the drawings, in which passages 104 and 101 are connected by cavity 102. With the cylinder cap so adjusted, fluid is released from the brake cylinder through passage 29, port 109, cavity 97, port 99, passage 101, passage 110, and past valve 45 to exhaust port 111 and also from passage 29, through cavity 105, passage 104, cavity 102, passage 110 and past valve 45 to exhaust port 111. Consequently, even if the main piston should move the valves 5 and 6 to graduated release lap, fluid would continue to release by way of the last mentioned set of ports and passages, so that a full release of air from the brake cylinder would be obtained.

In case of a train break-in-two, an electric emergency application will be obtained on the forward part of the train, due to current still being supplied, while the rear portion of the train will be subjected to a pneumatic emergency application of the brakes.

In the position of the cap 87 as shown in Fig. 10, cavity 160 therein connects passages 88 and 113, but the train pipe passage 81 is cut off, so that both the electric service and emergency valves are cut out of action. In Fig. 11, passages 81 and 88 are connected together by cavity 161, so that only the electric service valve is cut in. In the position shown in Fig. 12, a cavity 162 connects passage 81 with emergency passage 113, so that the electric service valve is cut out and the electric emergency valve cut in.

According to the construction shown in Fig. 9, an electro-pneumatic brake controlling valve mechanism similar to that shown in Figs. 6 to 8 is provided, but having certain additional features, such as means for supplying fluid from the main reservoir to the brake cylinder in an emergency application of the brakes, means for blowing down the auxiliary reservoir pressure in an emergency application, so as to permit a ready release of the brakes, and a chamber adapted to control the time in which the quick action and emergency switch devices remain open according to its volume. Ports and passages which have the same purposes and functions as those in the construction shown in Figs. 6 to 8 have corresponding reference numerals and in addition, the brake cylinder supply port 95 is connected to a supply or blow-down valve device 135 of any desired type, adapted to limit the pressure in said passage and the chambers which may be connected thereto, to a predetermined degree. Communication from port 95 to the brake cylinder is controlled by a valve 136 adapted to be operated by a piston 137, and for this purpose the valve chamber 138 is connected by passage 139 with passage 140 leading to the brake cylinder. For controlling the supply of fluid from the main reservoir to the brake cylinder, a piston valve 141 is provided having a seat 142 for controlling communication from main reservoir passage 143 to brake cylinder passage 140. The opposite side of the valve piston 141 is subject to the pressure of a spring 144 and is connected by passage 145 with a valve chamber 146 controlled by a pilot valve 147 which is adapted when opened to connect passage 145 with an exhaust passage 148. The pilot valve 147 is adapted to be operated by a piston 149, the chamber on the upper side of which is connected to a passage 150. A quick action valve chamber 151 is provided which is connected to a passage 152 controlled by a closing valve piston 153. The parts are charged up from the train pipe similarly to the construction shown in Figs. 6 to 8 and fluid from the main reservoir flows through passage 143 and a port 154 in valve piston 141 to the chamber at the lower side of said valve piston, so that the same is maintained in its seated position. Fluid from the train pipe is supplied to emergency slide valve piston 10 through passage 7, passage 155, port 80, and passages 81 and 82 so that piston 10 is shifted to release position and chamber 84 is charged with fluid under pressure through feed groove 83. In release position of emergency slide valve 11, a cavity 156 connects passage 150 with an exhaust port 157, so that the top of piston 149 is connected to the atmosphere and also chamber 151, through a port 158 in the closing valve 153. The piston 137 normally holds the valve 136 open by reason of fluid supplied to the top thereto through a passage 159 which is open in the release position of valve 11 to valve chamber 12.

An electric service application of the brakes is made by energizing the service magnet 46, which effects a gradual reduction in train pipe pressure to thereby operate the main piston 3 and supply fluid to the brake cylinder as previously described. In the present construction, however, air flows from the brake cylinder supply port 95 past valve 136 to passage 139 and passage 140, and the safety valve 135 being open to passage 95, the pressure of air supplied to the brake cylinder is limited to a predetermined degree according to the adjustment of the safety valve. The principal difference between this construction and the one previously described is in an emergency application of the brakes which will now be described.

The emergency magnet 37 having been energized, the valve 48 is opened to vent air from the train pipe and thereby cause the main piston 3 to shift to application postion, but this does not operate to supply fluid from the auxiliary reservoir to the brake cylinder because the movement of the emergency piston 10 to emergency position connects passage 159 through cavity 156 to the exhaust port 157, so that the piston 137 is operated to close the valve 136 and consequently communication from passage 95 to passage 139. Passage 95, however, is open to the safety valve 135, so that fluid from the auxiliary reservoir blows out through the safety valve until said pressure has been reduced to the degree at which the safety valve is adjusted. The purpose of this is to provide a low pressure on the auxiliary reservoir side of the main piston 3 so as to permit of a ready and prompt release of the brakes after an emergency application. In emergency position of valve 11, the passage 150 is uncovered, permitting fluid from chamber 84 to flow to the outer exposed area of the closing valve 153. Said valve is then lifted from its seat and fluid is supplied from the emergency chamber 84 to passage 31 and thence to quick action piston 14 and emergency switch piston 33 operating said pistons for the same purposes as heretofore described. Air also flows through passage 150 to the top of piston 149, operating the same to open pilot valve 147. Air is thereupon vented from below the valve piston 141 through passage 145, past valve 147, to exhaust passage 148. The main reservoir pressure acting on the outer exposed area of the valve piston 141 thereupon lifts same from its seat and establishes communication from the main reservoir passage 143 to passage 140 leading to the brake cylinder, so that the brake cylinder is supplied with fluid from the main reservoir. When the pressure in chamber 84 has substantially equalized into the chamber 151, through port 158 in the valve 153, said valve is closed by its spring and the fluid under pressure in passage 31 and on the pistons 14 and 33 escapes through port 90 in the piston 14 to the atmosphere thus permitting said pistons to move to their closed positions. In an emergency application of the brakes, the valves 11, 147, and 136 as well as the equalizing piston 3 remain in emergency position until the train pipe pressure is again restored. An increase in train pipe pressure shifts the emergency piston 10 to release position, opening passage 150 to the atmosphere, so that piston 149 moves to release position, closing the pilot valve 147. Fluid is also admitted to piston 137 through passage 159, forcing said piston downward to open the valve 136. Fluid from the brake cylinder may then escape through the usual exhaust ports of the equalizing or triple valve portion of the device.

In other respects, the various operations of the valve mechanism shown in Fig. 9 are substantially the same as those of the construction shown in Figs. 6 to 8, and consequently need not be further described.

Having now described my invention, what I claim as new and desire to secure by Letters Patent, is:—

1. In an electro-pneumatic brake, the combination with a train pipe and an automatic valve dvice operating upon a gradual reduction in train pipe pressure to make its full traverse and effect a service application of the brakes, of an electrically controlled valve means for effecting a gradual reduction in train pipe pressure, means for producing an emergency application of the brakes, and an electrically controlled emergency device for effecting the operation of said means.

2. In an electro-pneumatic brake, the combination with a train pipe and an automatic valve device operating upon a gradual reduction in train pipe pressure to make its full traverse and effect a service application of the brakes, of an electrically controlled valve means for effecting a gradual reduction in train pipe pressure, means operating upon a sudden reduction in train pipe pressure for producing an emergency application of the brakes, and an electrically controlled emergency device for effecting a sudden reduction in pressure on said means.

3. In an electro-pneumatic brake, the combination with a train pipe and a valve device operating upon a gradual reduction in train pipe pressure for effecting a service application of the brakes, of means operating upon a sudden reduction in fluid pressure for effecting an emergency application of the brakes, an electrically controlled valve for venting air from the train pipe to the brake cylinder for operating said valve device, and electrically controlled valve means for effecting a sudden reduction in fluid pressure to operate said means.

4. In an electro-pneumatic brake, the combination with electrically controlled means for effecting a service application of the brakes and electrically controlled means for effecting an emergency application of the brakes, of a device having one position for cutting the electric service means out of action and another position for cutting the electric emergency means out of action.

5. In an electro-pneumatic brake, the combination with electrically controlled means for effecting a service application of the brakes and electrically controlled means for effecting an emergency application of the brakes, of a device having positions for cutting either the electric service, or emergency means, or both out of action.

6. In an electro-pneumatic brake, the combination with electrically controlled means for effecting a service application of the brakes and electrically controlled means for effecting an emergency application of the brakes, of a device having positions for cutting the service means out of action, the emergency means, and both the service and the emergency means into and out of action.

7. In an electro-pneumatic brake, the combination with an auxiliary reservoir, of electrically controlled means for supplying fluid from the auxiliary reservoir to the brake cylinder in a service application of the brakes and from an additional source of fluid pressure in an emergency application of the brakes and means for reducing the auxiliary reservoir pressure in an emergency application to permit of a ready release of the brakes.

8. In an electro-pneumatic brake, the combination with an auxiliary reservoir, of electrically controlled means for supplying fluid from the auxiliary reservoir to the brake cylinder in a service application of the brakes and only from an additional source of fluid pressure in an emergency application of the brakes and a safety valve device for blowing down the auxiliary reservoir pressure in an emergency application to facilitate the release of the brakes.

9. In an electro-pneumatic brake, the combination with an auxiliary reservoir, of electrically controlled means for supplying fluid from the auxiliary reservoir to the brake cylinder in a service application of the brakes and electrically controlled means for supplying fluid from the main reservoir to the brake cylinder in an emergency application of the brakes.

10. In a fluid pressure brake, the combination with a train pipe and a quick action valve device operated by fluid under pressure in an emergency application of the brakes for venting fluid from the train pipe, of a closing valve device subject to the opposing pressures of the brake cylinder and the flow of air to the brake cylinder in an emergency application of the brakes for controlling the supply of air to the quick action valve device.

11. In a fluid pressure brake, the combination with a train pipe and a quick action valve device operated by fluid under pressure in an emergency application of the brakes for venting fluid from the train pipe, of a closing valve device subject to the opposing pressures of the brake cylinder and the flow of air to the brake cylinder in an emergency application of the brakes for controlling the supply of air to the quick action valve device, said quick action valve device being provided with a leakage port for permitting the escape of operating fluid upon the closing of the closing valve device.

12. In a fluid pressure brake, the combination with a train pipe, of a valve device normally subject to opposing fluid pressures for controlling communication for supplying fluid to the brake cylinder in an emergency application of the brakes, an emergency valve mechanism operating upon a sudden reduction in fluid pressure for venting fluid from cne side of said valve device to open said communication, a quick action valve means operated by fluid under pressure for venting fluid from the train pipe, and a closing valve operated by the flow of air through said communication to the brake cylinder for supplying fluid to said quick action valve means.

13. In an electro-pneumatic brake, the combination with a train pipe and a quick action valve device for venting fluid from the train pipe in an emergency application of the brakes, of an electrically controlled means for initially supplying fluid to said quick action valve device to operate the same, and a valve device operating upon equalization of the pressure of a source of fluid pressure into the brake cylinder to cut off the supply of fluid to said quick action valve device and thereby permit same to close.

14. In an electro-pneumatic brake, the combination with a train pipe and a quick action valve device for venting fluid from the train pipe in an emergency application of the brakes, of an electrically controlled means for initially supplying fluid to said quick action valve device to operate the same, an electric switch device for controlling the circuit of said electrically controlled means and also initially operated by the fluid supplied to said quick action valve device, and a valve device operating upon equalization of the pressure of a source of fluid pressure into the brake cylinder to cut off the supply of fluid to said quick action valve device and said electric switch device.

15. In an electro-pneumatic brake, the combination with a train pipe, a valve mechanism operating upon a gradual reduction in train pipe pressure for effecting a service application of the brakes, and a valve mechanism operating upon a sudden reduction in train pipe pressure for effecting an emergency application of the brakes, of an electro-magnet controlled valve for effecting a gradual reduction in train pipe pressure, an electro-magnet controlled valve for effecting a sudden reduction in train pipe pressure, and manually operated means having one position for effecting a gradual reduction in train pipe pressure and for causing the operation of the electro-magnet controlled service valve and another position for effecting a sudden reduction in train pipe pressure and for causing the operation of said electro-magnet controlled emergency valve.

16. In an electro-pneumatic brake, the combination with a train pipe, an automatic valve device operating upon a gradual reduction in train pipe pressure for effecting a service application of the brakes, and means operating upon a sudden reduction in train pipe pressure for effecting an emergency application of the brakes, of an electrically controlled valve for effecting the operation of said automatic valve device, and an electrically controlled valve for effecting the operation of said emergency controlling means.

17. In an electro-pneumatic brake, the combination with a train pipe, an automatic valve device operating upon a gradual reduction in train pipe pressure for effecting a service application of the brakes, and means operating upon a sudden reduction in train pipe pressure for effecting an emergency application of the brakes, of an electrically controlled valve for effecting the operation of said automatic valve device, an electrically controlled valve for effecting the operation of said emergency controlling means, and a manually controlled device adapted to cause the simultaneous operation of said automatic valve device and said emergency controlling means, both electrically and pneumatically.

18. In an electro-pneumatic brake, the combination with fluid pressure operated valve mechanism for effecting an application of the brakes, of electric and pneumatic means for effecting the operation of said valve mechanism and a single manually operated handle for simultaneously controlling said electric and said pneumatic means.

In testimony whereof I have hereunto set my hand.

WALTER V. TURNER.

Witnesses:
A. M. CLEMENTS,
ROBERT H. McCLELLAN.